(12) United States Patent
Rifani et al.

(10) Patent No.: US 7,386,749 B2
(45) Date of Patent: Jun. 10, 2008

(54) CONTROLLING SEQUENCE OF CLOCK DISTRIBUTION TO CLOCK DISTRIBUTION DOMAINS

(75) Inventors: Michael C. Rifani, Beaverton, OR (US); Vaughn J. Grossnickle, Beaverton, OR (US); Keng L. Wong, Portland, OR (US)

(73) Assignee: Intel Corporation, Santa Clara, CA (US)

(*) Notice: Subject to any disclaimer, the term of this patent is extended or adjusted under 35 U.S.C. 154(b) by 334 days.

(21) Appl. No.: 11/073,294

(22) Filed: Mar. 4, 2005

(65) Prior Publication Data

US 2006/0200694 A1 Sep. 7, 2006

(51) Int. Cl.
*G06F 1/12* (2006.01)
*G06F 1/14* (2006.01)
*G06F 1/00* (2006.01)

(52) U.S. Cl. .................. 713/400; 713/502; 713/322
(58) Field of Classification Search ............. 713/400, 713/502, 322; 716/10
See application file for complete search history.

(56) References Cited

U.S. PATENT DOCUMENTS

| 4,796,234 | A | 1/1989 | Itoh et al. |
| 5,586,307 | A | 12/1996 | Wong et al. |
| 5,623,647 | A * | 4/1997 | Maitra ..................... 713/501 |
| 6,611,920 | B1 * | 8/2003 | Fletcher et al. ............ 713/322 |
| 6,647,540 | B2 * | 11/2003 | Lindkvist et al. ............ 716/10 |
| 6,779,122 | B2 | 8/2004 | George et al. |

FOREIGN PATENT DOCUMENTS

DE 10041688 3/2002

* cited by examiner

*Primary Examiner*—Chun Cao
*Assistant Examiner*—Suresh K Suryawanshi
(74) *Attorney, Agent, or Firm*—Blakely, Sokoloff, Taylor & Zafman LLP (57) ABSTRACT

An embodiment of the present invention is a technique to control clock distribution to a circuit. A scheduler schedules a sequence of a clock distribution of clock signals to a plurality of clock distribution domains (CKDOMs) in the circuit according to a state status of the circuit. A controller controls enabling the clock distribution to the CKDOMs according to the scheduled sequence.

36 Claims, 6 Drawing Sheets

CONTROLLING SEQUENCE OF CLOCK DISTRIBUTION TO CLOCK DISTRIBUTION DOMAINS

BACKGROUND

1. Field of the Invention

Embodiments of the invention relate to the field of microprocessors, and more specifically, to clock distribution.

2. Description of Related Art

As speed of high performance microprocessors becomes faster and faster, it is advantageous to have a reliable clock generation. Clock signals are typically routed to several circuit elements within the core of a processor. When the power state of the processor changes, the clock distribution network may undergo transitions from an inactive state to an active state, or vice versa. These transitions may cause large systematic power supply disturbances that may adversely impact sensitive or mixed-signal circuits on the processor.

Existing techniques addressing the problem of transitions of clock distribution have a number of disadvantages. One technique is to build special circuits to withstand the supply disturbances. This technique is costly, requiring additional silicon area. It may also not be flexible enough to handle a variety of disturbance phenomena.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to control a clock distribution to a circuit. A scheduler schedules a sequence of a clock distribution of clock signals to a plurality of clock distribution domains (CKDOMs) in the circuit according to a state status of the circuit. A controller controls enabling the clock distribution to the CKDOMs according to the scheduled sequence.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to control clock distribution to a circuit. The circuit includes a plurality of clock distribution domains (CKDOMs). Each of the CKDOMs uses a clock signal provided by a clock generator. A clock sequencer controls a sequence of a clock distribution to the CKDOMs such that each of the CKDOMs receives an enable or a disable control signal to enable or disable its clock signal one at a time when the circuit changes its state status. By distributing the clock signals according to a scheduled sequence, the power disturbances, current surge, or noise present in the circuit is reduced, providing a reliable operation during a state change of the circuit.

Figure 1A:
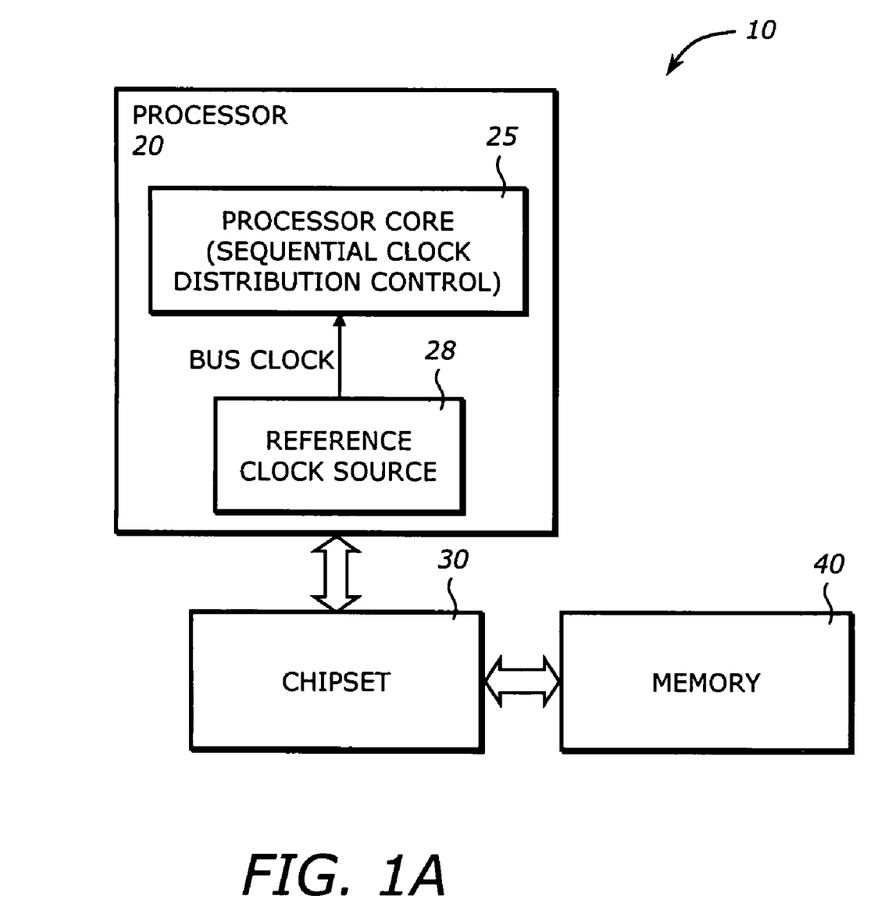
FIG. 1A is a diagram illustrating a system in which one embodiment of the invention can be practiced.

FIG. 1A is a diagram illustrating a system 10 in which one embodiment of the invention can be practiced. The system 10 includes a processor 20, a chipset 30, and a main memory 40. The system 10 may contain other elements such as mass storage device (e.g., compact disk read only memory, hard drive), input/output devices (e.g., mouse, keyboard, display monitor), and other chipsets.

The processor 20 represents any integrated circuit having a clock distribution. This may include large, dense, or high power devices. Examples of these devices may be microprocessors, media processors, network devices, chipsets, graphics processor, etc. When it is a microprocessor, the processor 20 may be a central processing unit of any type of architecture, such as processors using hyper-threading, security, or virtualization technologies, single-core processors, multi-core processors, embedded processors, mobile processors, network processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. It includes a processor core 25 and a reference clock source 28. The processor 25 contains circuits that have sequential clock distribution control functionalities. The reference clock source 28 provides stable clock signal to the processor core 25. Examples of the reference clock source 28 may include circuitry to interface to external crystal oscillators, or any other clock sources.

The chipset 30 is any chipset that provides integrated functionalities such as memory control, graphics processing, and input/output interfaces. Examples of the chipset 30 may include a memory control hub (MCH), an input/output control hub (ICH), and graphics and memory control hub (GMCH). The memory 40 contains instructions or data for the processor. It may be a read-only memory (ROM), and random access memory (RAM), a flash memory, or any other suitable memory that can be accessed by the processor 20. The chipset 30 may be external or internal to the processor 20. For example, a memory controller may be in the same die as the processor. For multi-core processors, the chipset 30 may work for all core or processors in the chip, or may include different portions that may work separately for different cores or processors in the chip.

Figure 1B:
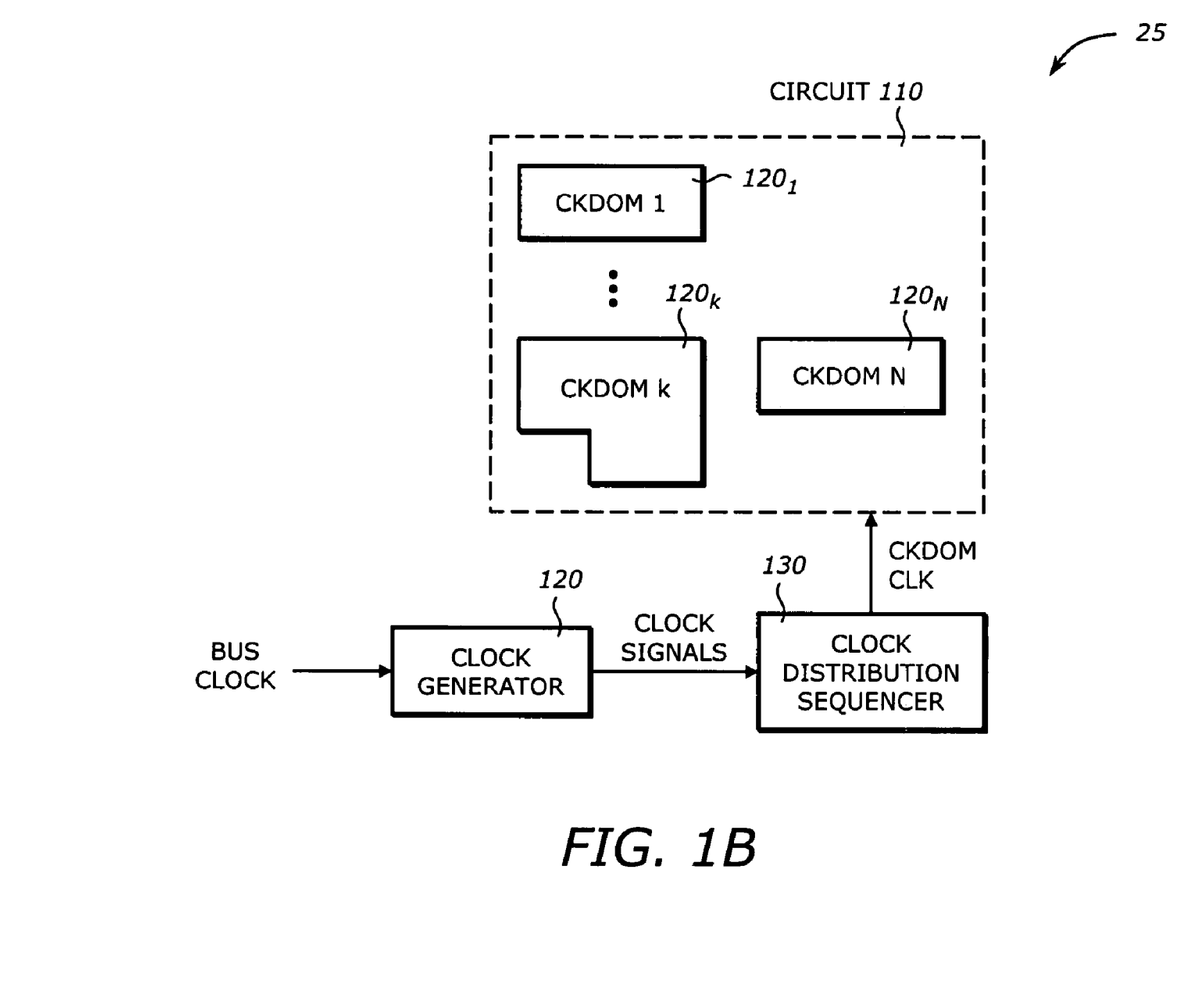
FIG. 1B is a diagram illustrating a processor core according to one embodiment of the invention.

FIG. 1B is a diagram illustrating a processor core 25 in which one embodiment of the invention can be practiced. The processor core 25 includes a circuit 110, a clock generator 120, and a clock distribution sequencer 130.

The circuit 110 is any circuit that receives clock signals from the clock distribution sequencer 130. In one embodiment, the circuit 110 has a state status that indicates the status of the operational states of the circuit. The state status may indicate a transition from an inactive state to an active state or from an active state to an inactive state. An active state is a state in which the circuit 10 is operating normally or in a power-up state. In the active state, the circuit 10 receives clock signals to clock various circuit elements. The inactive state is a state in which the processor is idle, in a standby mode, or in a power-down state. In the inactive state, the circuit 110 does not receive clock signals. Typically, the active state corresponds to a fully functional, high-power consumption mode, and the inactive state corresponds to a low-power or standby mode.

The circuit 110 includes N clock distribution domains (CKDOMs) $120_1$ to $120_N$. A CKDOM includes circuit elements on the processor 100 that operates with a common clock signal. The circuit elements in each of the CKDOMs may include digital components, analog components, or mixed-mode components. The circuit elements are grouped into CKDOM based on some criteria. Examples of these criteria include load distribution of clock signals, cross-talk interferences, physical location, etc. The number of the CKDOMs depends on the complexity or the clock load of the circuit 110. It also depends on the impact of the concurrent switching capacitive load of the circuit 110 on the clock generator 120. In one embodiment, the CKDOMs are formed such that the circuit elements are distributed or scattered over the physical layout of the circuit. An advantage of this grouping scheme is that when the CKDOMs are powered sequentially, or powered down, the power sequence distributes the supply stress evenly over the entire circuit, and is not concentrated in a small area.

The clock generator 120 receives a reference clock signal, such as a bus clock, and generates multiple clock signals to the CKDOM's. The frequency of the output from the clock generator 120 may be a product of a factor alpha and the frequency of the input to the clock generator 120, where alpha may be any positive non-zero real or integer number. Typically the bus clock signal is in order of Megahertz (MHz) while the clock signals generated by the clock generator 120 are in the order of Gigahertz (GHz). In one embodiment, the clock generator 120 includes a phase-locked loop (PLL) circuit. The PLL circuit generates clock signals from the bus clock using techniques that are well known in the art. The PLL circuit typically has a lock acquisition time in which the circuit tries to lock onto a clock signal. During this lock acquisition time, it is preferable that the circuit environment is quiet or noise-free so that the locking can be reliably performed.

The clock distribution sequencer 130 controls the sequence of a clock distribution to the CKDOMs in the circuit 110. During the system state transition, the clock distribution sequencer 130 is the first one that receives a clock signal so that it can provide control actions to the CKDOMs. The clock distribution sequencer 130 enables or activates the clock distribution of the clock signals from the clock generator 120 to the CKDOMs in the circuit 110 sequentially, or one at a time. The activation of the clock distribution is staggered over time to distribute the change in power consumption. This sequential clock distribution provides a gradual change in power consumption. The effect of this gradual change during a state transition is to provide a smooth transition of power consumption, resulting in a quiet or less noisy environment for the clock generator 120.

During the inactive state, the CDKOMs do not receive clock signals. For CKDOMs having dynamic elements that need clocking to avoid loss of data, the inactive state is typically the power down state where the CKDOMs are not supposed to retain any useful information. In this scenario, the sequential clock distribution provided by the sequencer 130 is most useful during the power up period. However, when the CKDOMs contain static elements where clocking is not necessary during standby mode, the sequential clock distribution may be used either during power up period, or any other time period that static standby mode is acceptable. The clock distribution sequencer 130, therefore, may be used in any applications where a change state in which clocking to the circuit elements in the CKDOMs is not needed during the inactive state.

Figure 2:
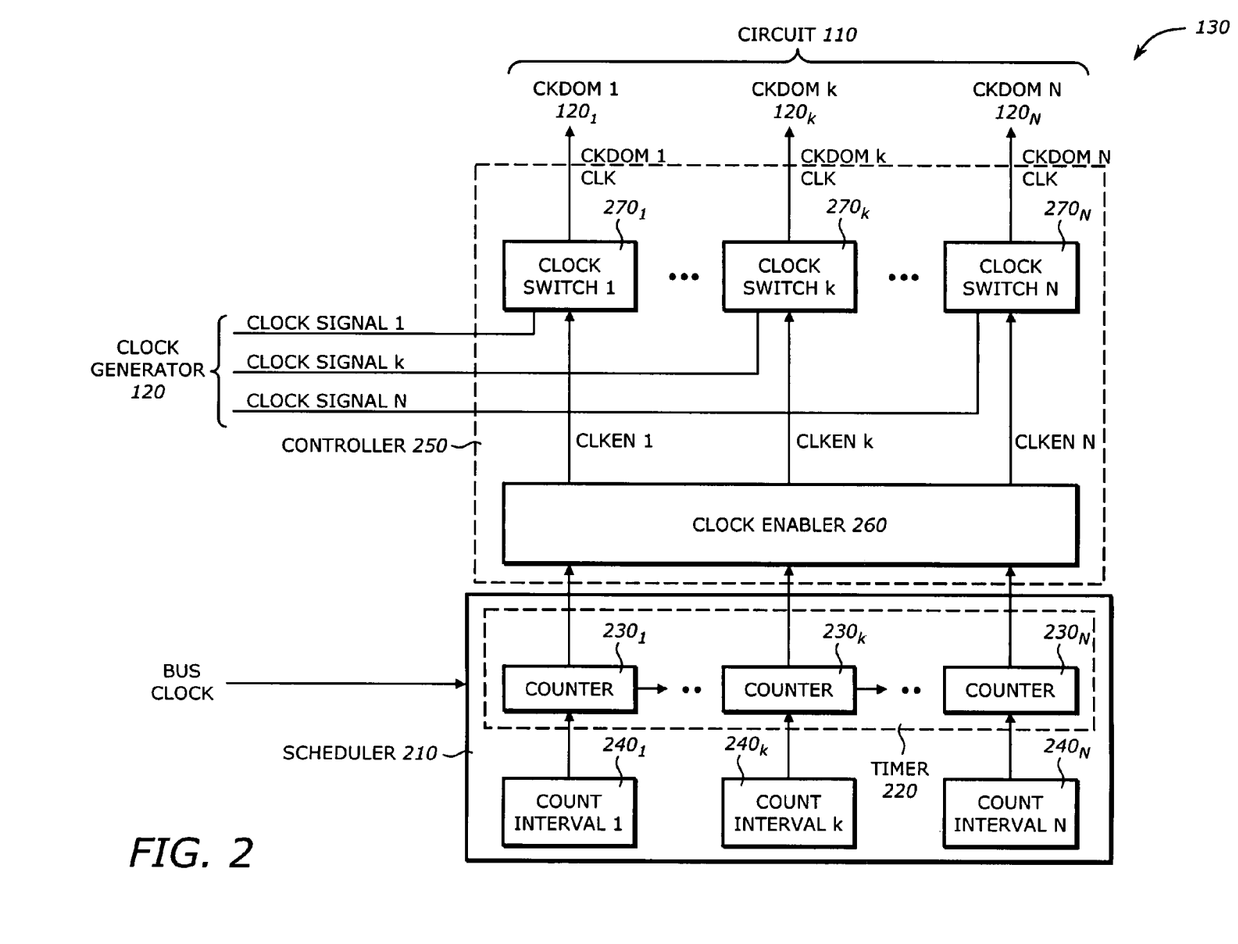
FIG. 2 is a diagram illustrating a clock distribution sequencer according to one embodiment of the invention.

FIG. 2 is a diagram illustrating a clock distribution sequencer 130 according to one embodiment of the invention. The clock distribution sequencer includes a scheduler 210, and a controller 250.

The scheduler 210 schedules a sequence of a clock distribution of clock signals to the CKDOMs in the circuit 110 according to a state status of the circuit 110. The sequence of the clock distribution corresponds to a sequence of quiet intervals during the lock acquisition time of the PLL circuit in the clock generator 120. This helps reducing adverse affect of current surge or power disturbances caused by the transition of the system state. The scheduler 210 includes a timer 220 and storage elements $240_1$ to $240_N$. The timer 220 is clocked by the bus clock to generate timing signals for the sequence. In one embodiment, the timer 220 includes N counters $230_1$ to $230_N$ corresponding to the N CKDOMs in the circuit 110. Each of the N counters $230_1$ to $230_N$ has a counting interval corresponding to a waiting period in the scheduled sequence for each of the CKDOMs. The counting intervals for the N counters $230_1$ to $230_N$ may be the same or different depending on how the CKDOMs are organized and/or the sequencing strategy. The counting interval of the counter $230_k$ corresponds to the waiting period of a CKDOM k after the CKDOM(k−1) is enabled. The storage elements $240_1$ to $240_N$ store pre-programmed values that correspond to the counting interval. The pre-programmed values may be fixed or programmable dynamically according to system configuration or power consumption profile.

The controller 250 controls enabling the clock distribution to the CKDOMs according to the scheduled sequence. The controller 250 includes a plurality of clock switches $270_1$ to $270_N$ and a clock enabler 260. The clock switches $270_1$ to $270_N$ activate or deactivate the clock distribution of the clock signals to the CKDOMs. The clock switches $270_1$ and $270_N$ may be implemented as simple logic gates (AND, OR) and/or buffers. The clock enabler 260 enables or disables the clock switches $270_1$ to $270_N$ in response to the timing signals from the scheduler 210. The clock enabler 260 may be implemented as a decoder or a shift register. The clock enabler 260 activates the clock distribution to the CKDOMs by enabling the clock switches $270_1$ to $270_N$ such that each of the CKDOMs receives an associated clock signal one at a time according to the scheduled sequence. The clock enabler 260 deactivates the clock distribution to the CKDOMs by disabling the clock switches $270_1$ to $270_N$ such that each of the CKDOMs stops receiving an associated clock signal one at a time according to the scheduled sequence.

Figure 3:
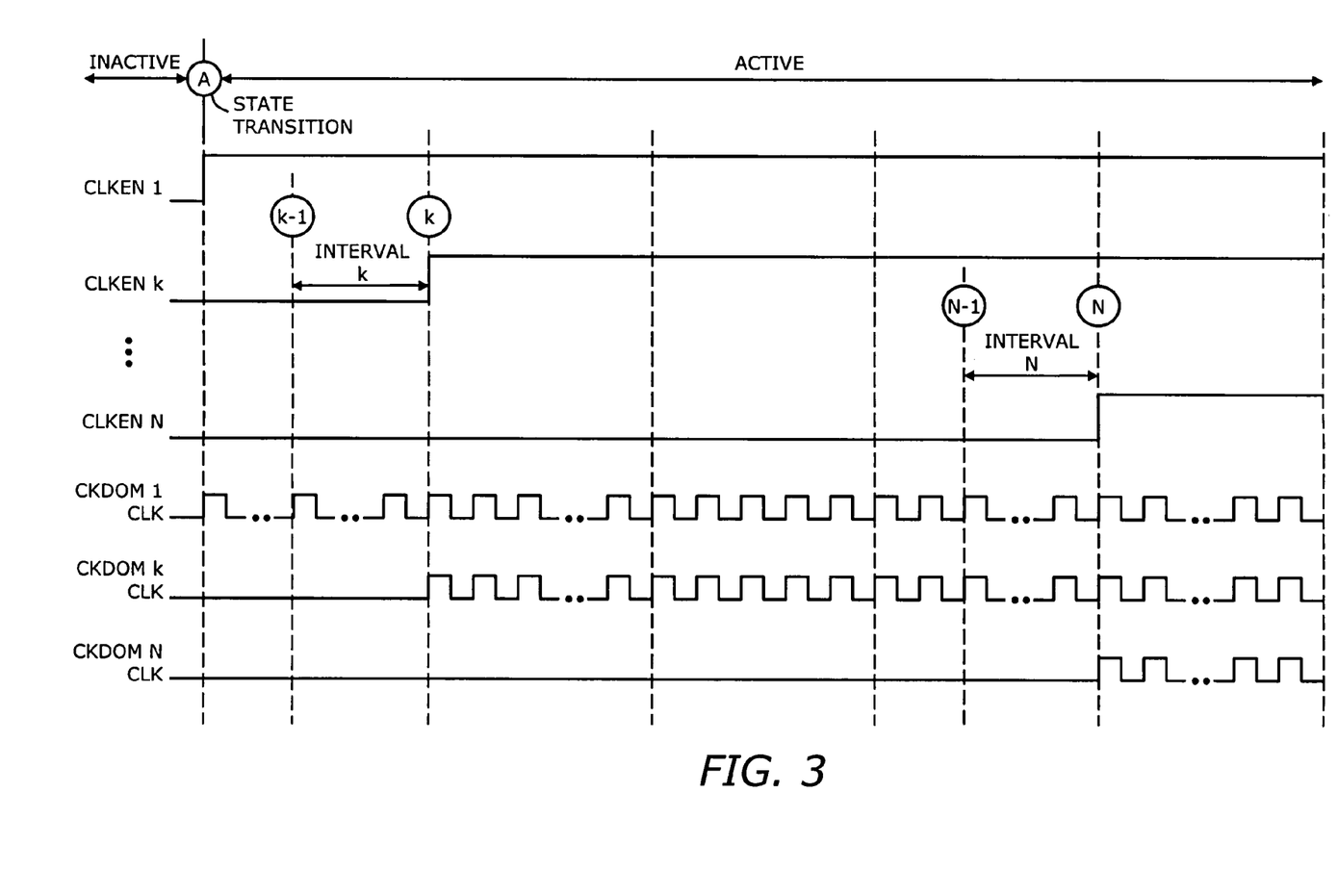
FIG. 3 is a timing diagram illustrating a sequence of clock distribution from an inactive state to an active state according to one embodiment of the invention.

FIG. 3 is a timing diagram illustrating a sequence of clock distribution from an inactive state to an active state according to one embodiment of the invention.

During the inactive state all the clock enable signals are negated (e.g., LOW) indicating that the clock signals are not distributed to the CKDOMs. When the power status of the circuit indicates there is a state change, a transition from the inactive state to the active state occurs at line A. At this transition, the enabling of a sequence of clock distribution starts with the first CKDOM. Clock enable 1 (CLKEN1) signal is asserted (e.g., HIGH) indicating that the clock signal associated with the first CKDOM is enabled. The CLKEN1 signal remains asserted until the next state change occurs such as when there is a power down sequence. The sequence of distribution continues to the next CKDOM. The clock enable k (CLKENK) signal is asserted (e.g., HIGH) indicating that the clock signal associated with the $k^{th}$ CKDOM is enabled. The time interval k is the counting interval between the enable times of the CKDOM(k−1) and the CKDOM k. It is the waiting period of the CKDOM k after the CKDOM(k−1) is enabled. The sequence continues until the last CKDOM is reached. The time interval N is the counting interval between the enable times of the CKDOM (N−1) and the CKDOM N. The time intervals between successive enable times of the clock signals may be the same or different depending on the configuration of the CKDOMs and/or the sequencing strategy.

During the time the clock enable signals are asserted, the clock signals associated with the activated CKDOMs are enabled. As shown in the timing diagram, these clock signals (CKDOM1CLK, CKDOMkCLK, etc.) are activated or enabled one at a time according to the scheduled sequence.

Figure 4:
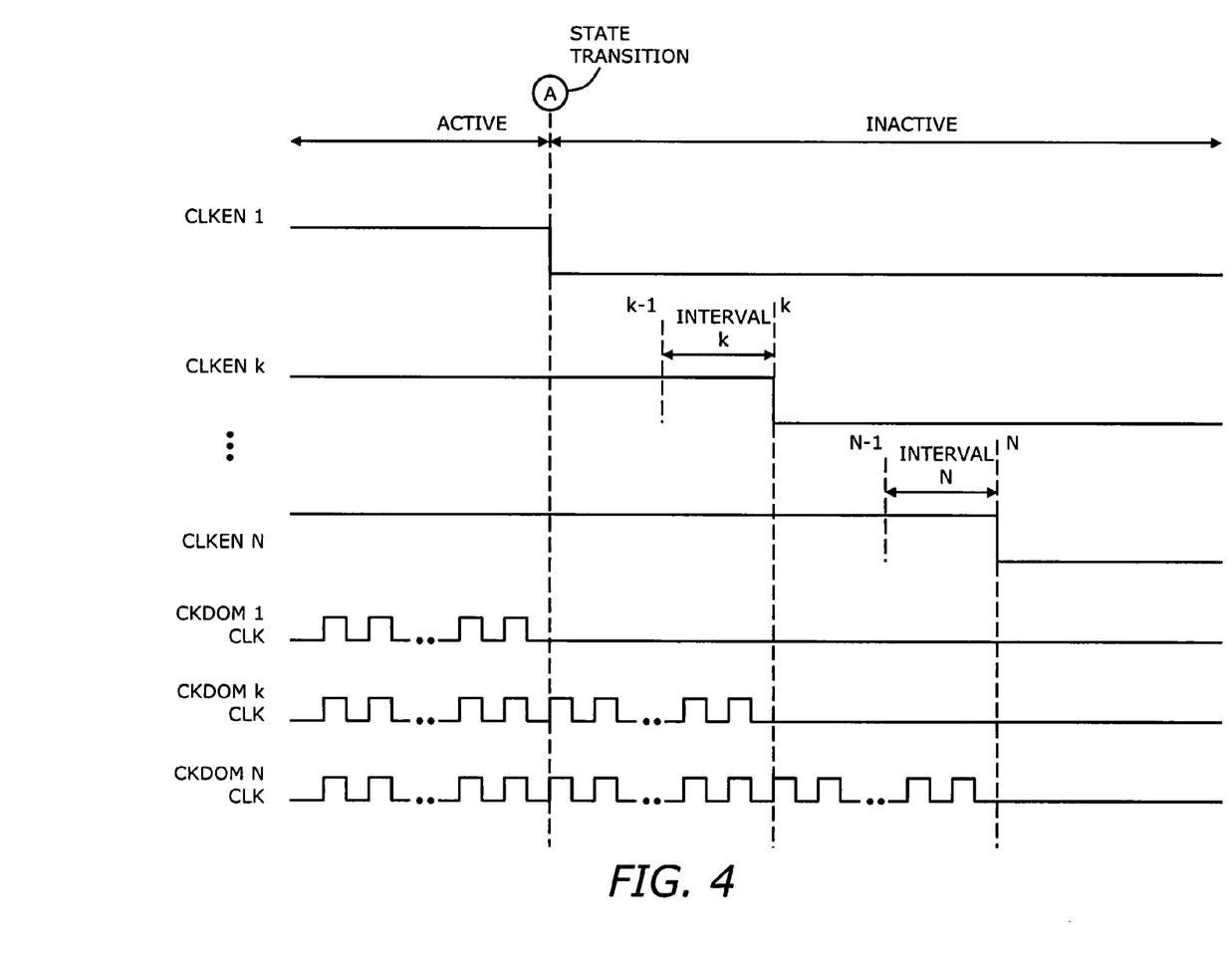
FIG. 4 is a timing diagram illustrating a sequence of clock distribution from an active state to an inactive state according to one embodiment of the invention

FIG. 4 is a timing diagram illustrating a sequence of clock distribution from an active state to an inactive state according to one embodiment of the invention.

During the active state, all the clock enable signals are asserted (e.g., HIGH) indicating that the clock signals are distributed to the CKDOMs. When the state status of the circuit indicates there is a state change, a transition from the active state to the inactive state occurs at line A. At this transition, the disabling of a sequence of clock distribution starts with the first CKDOM. Clock enable 1 (CLLKEN1) signal is negated (e.g., LOW) indicating that the clock signal associated with the first CKDOM is disabled. The CLKEN1 signal remains negated until a state change occurs such as when there is a power up sequence. The sequence of distribution continues to the next CKDOM. The clock enable k (CLKENK) signal is negated (e.g., LOW) at line B indicating that the clock signal associated with the $k^{th}$ CKDOM is disabled. The sequence continues until the last CKDOM is reached. As in FIG. 4, the time intervals between successive disable times of the clock signals may be the same or different.

During the time the clock enable signals are negated, the clock signals associated with the activated CKDOMs are disabled. As shown in the timing diagram, these clock signals (CKDOM1CLK, CKDOMkCLK, etc.) are deactivated or disabled one at a time according to the scheduled sequence.

Figure 5:
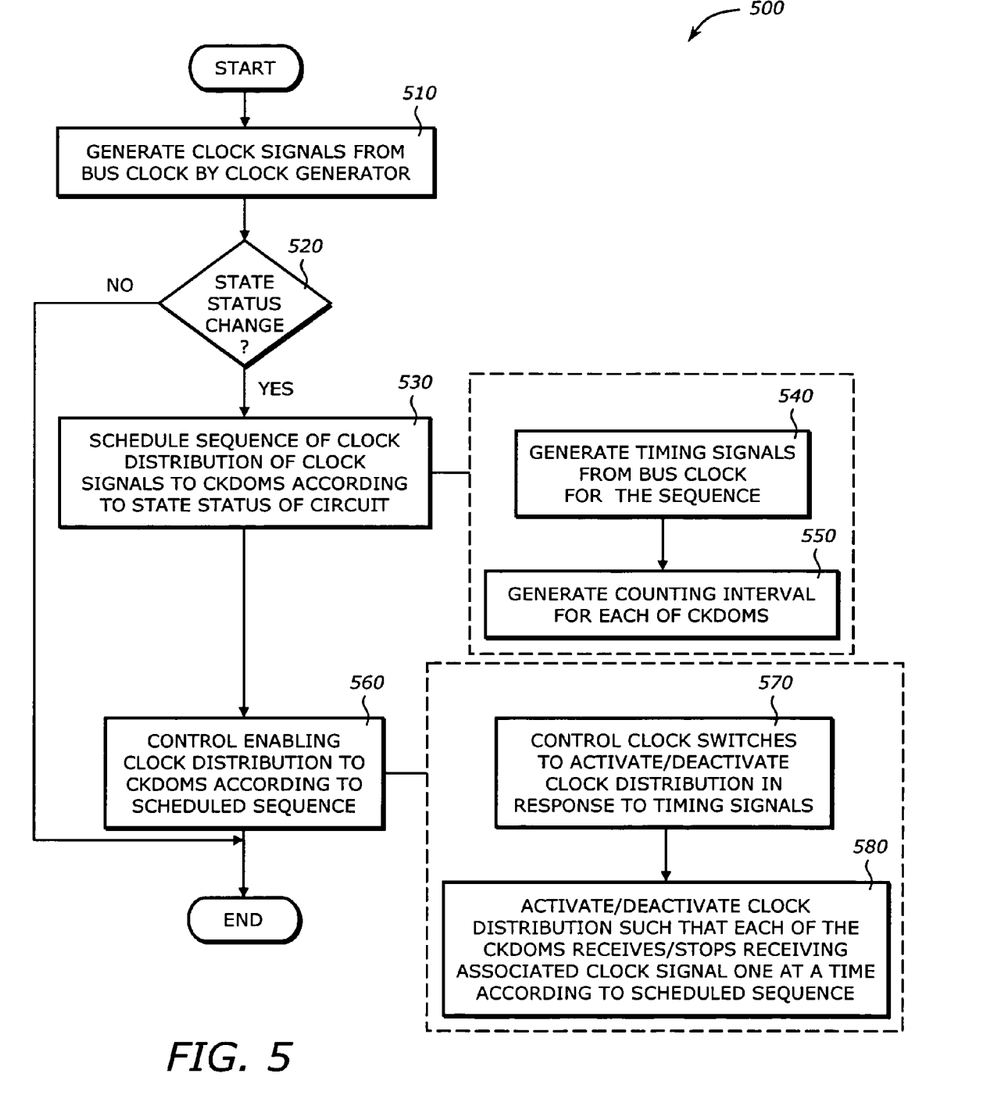
FIG. 5 is a flowchart illustrating a process to control a sequence of clock distribution according to one embodiment of the invention.

FIG. 5 is a flowchart illustrating a process 500 to control a sequence of clock distribution according to one embodiment of the invention.

Upon START, the process 500 generates clock signals from a stable clock source such as a bus clock from a clock generator (Block 510). Next, the process 500 determines if a state change occurs (Block 520). The state change may be any suitable system level status change such as power-up, power-down, standby, etc.

Then, the process 500 schedules a sequence of clock distribution of the clock signals to the CKDOMs according to the state status of the circuit (Block 530). To do this, the process 500 generates timing signals from a stable clock source such as the bus clock for the sequence (Block 540). This may be achieved by generating a counting interval for each CKDOM using a counter (Block 550). The counting interval may be pre-programmed in a storage element as input to the counter.

Next, the process 500 controls enabling the clock distribution to the CKDOMs according to the scheduled sequence (Block 560). To do this, the process 500 controls the clock switches to activate or deactivate the clock distribution in response to the timing signals (Block 570). The process 500 activates or deactivates the clock distribution such that each of the CKDOMs receives or stops receiving the associated clock signal one at a time according to the scheduled sequence (Block 580). The process 500 is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a scheduler to schedule a sequence or a clock distribution of clock signals to a plurality of clock distribution domains (CKDOMs) in a circuit according to a state status of the circuit; and
    a controller coupled to the scheduler to control enabling the clock distribution to the CKDOMs according to the scheduled sequence;
    wherein the scheduler comprises:
    a timer clocked by a bus clock to generate timing signals for the sequence.

2. The apparatus of claim 1 wherein the timer comprises:
    a plurality of counters, each having a counting interval corresponding to a waiting period in the scheduled sequence for each of the CKDOMs.

3. The apparatus of claim 1 wherein the controller comprises:
    a plurality of clock switches to activate or deactivate the clock distribution of the clock signals to the CKDOMs; and
    a clock enabler to enable or disable the clock switches in response to the timing signals.

4. The apparatus of claim 3 wherein the clock enabler activates the clock distribution to the CKDOMs such that each of the CKDOMs receives an associated clock signal one at a time according to the scheduled sequence.

5. The apparatus of claim 3 wherein the clock enabler deactivates the clock distribution to the CKDOMs such that each of the CKDOMs stops receiving an associated clock signal one at a time according to the scheduled sequence.

6. The apparatus of claim 1 wherein the clock distribution is provided by a clock generator generating the clock signals to the CKDOMs from a bus clock.

7. The apparatus of claim 6 wherein the clock generator comprises a phase-locked loop (PLL) circuit having a lock acquisition time.

8. The apparatus of claim 7 wherein the sequence of the clock distribution corresponds to a sequence of quiet intervals during the lock acquisition time.

9. The apparatus of claim 1 wherein the state status is a transition from an active state to an inactive state or from an inactive state to an active state.

10. A method comprising:
  scheduling a sequence of a clock distribution of clock signals to a plurality of clock distribution domains (CKDOMs) in a circuit according to a state status of the circuit; and
  controlling enabling the clock distribution to the CKDOMs according to the scheduled sequence;
  wherein scheduling comprises:
  generating timing signals for the sequence using a timer clocked by a bus clock.

11. The method of claim 10 wherein generating the timing signals comprises:
  generating a counting interval corresponding to a waiting period in the scheduled sequence for each of the CKDOMs.

12. The method of claim 10 wherein controlling comprises:
  controlling clock switches to activate or deactivate the clock distribution to the CKDOMs in response to the timing signals.

13. The method of claim 12 wherein controlling the clock switches comprises activating the clock distribution to the CKDOMs such that each of the CKDOMs receives an associated clock signal one at a time according to the scheduled sequence.

14. The method of claim 12 wherein controlling the clock switches comprises deactivating the clock distribution to the CKDOMs such that each of the CKDOMs stops receiving an associated clock signal one at a time according to the scheduled sequence.

15. The method of claim 10 further comprising generating the clock signals to the CKDOMs from a bus clock by a clock generator.

16. The method of claim 15 wherein generating the clock signals comprises generating the clock signals by a phase-locked loop (PLL) circuit having a lock acquisition time.

17. The method of claim 16 wherein scheduling comprises scheduling the sequence of the clock distribution to correspond to a sequence of quiet intervals during the lock acquisition time.

18. The method of claim 10 wherein scheduling comprises scheduling the sequence of the clock distribution according to the state status being a transition from an active state to an inactive state or from an inactive state to an active state.

19. A system comprising:
  a circuit having a plurality of clock distribution domains (CKDOMs;
  a clock generator coupled to the circuit to provide clock signals to the CKDOMs; and
  a clock sequencer coupled to the clock generator and the circuit, the clock sequencer comprising:
  a scheduler to schedule a sequence of a clock distribution of clock signals to the CKDOMs according to a state status of the circuit, and
  a controller coupled to the scheduler to control enabling the clock distribution to the CKDOMs according to the scheduled sequence;
  wherein the scheduler comprises:
  a timer clocked by a bus clock to generate timing signals for the sequence.

20. The system of claim 19 wherein the timer comprises:
  a plurality of counters, each having a counting interval corresponding to a waiting period in the scheduled sequence for each of the CKDOMs.

21. The system of claim 19 wherein the controller comprises:
  a plurality of clock switches to activate or deactivate the clock distribution of the clock signals to the CKDOMs; and
  a clock enabler to enable or disable the clock switches in response to the timing signals.

22. The system of claim 21 wherein the clock enabler activates the clock distribution to the CKDOMs such that each of the CKDOMs receives an associated clock signal one at a time according to the scheduled sequence.

23. The system of claim 21 wherein the clock enabler deactivates the clock distribution to the CKDOMS such that each of the CKDOMs stops receiving an associated clock signal one at a time according to the scheduled sequence.

24. The system of claim 19 wherein the clock generator generates the clock signals to the CKDOMs from a bus clock.

25. The system of claim 24 wherein the clock generator comprises a phase-locked loop (PLL) circuit having a lock acquisition time.

26. The system of claim 25 wherein the sequence of the clock distribution corresponds to a sequence of quiet intervals during the lock acquisition time.

27. The system of claim 19 wherein the state status is a transition from an active state to an inactive state or from an inactive state to an active state.

28. The apparatus of claim 2 wherein the scheduler further comprises:
  a plurality of storage elements coupled to the plurality of counters, each of the storage elements storing a pre-programmed value corresponding to the counting interval.

29. The apparatus of claim 9 wherein the CDKOMs do not receive the clock signals during the inactive state.

30. The apparatus of claim 9 wherein the inactive state corresponds to a low-power or standby mode.

31. The method of claim 11 wherein scheduling further comprises:
  storing a pre-programmed value corresponding to the counting interval in each of a plurality of storage elements coupled to the plurality of counters.

32. The method of claim 18 wherein the CDKOMs do not receive the clock signals during the inactive state.

33. The method of claim 18 wherein the inactive state corresponds to a low-power or standby mode.

34. The system of claim 20 wherein the scheduler further comprises:
  a plurality of storage elements coupled to the plurality of counters, each of the storage elements storing a pre-programmed value corresponding to the counting interval.

35. The system of claim 27 wherein the CDKOMs do not receive the clock signals during the inactive state.

36. The system of claim 27 wherein the inactive state corresponds to a low-power or standby mode.

* * * * *